United States Patent [19]

Tou et al.

[11] Patent Number: 5,555,363
[45] Date of Patent: Sep. 10, 1996

[54] RESETTING THE CASE OF TEXT ON A COMPUTER DISPLAY

[75] Inventors: Frederich N. Tou, Cupertino; Stephen P. Capps, San Carlos; Gregg S. Foster, Woodside; Ernest H. Beernink, San Carlos, all of Calif.

[73] Assignee: Apple Computer, Inc., Cupertino, Calif.

[21] Appl. No.: 130,602

[22] Filed: Sep. 30, 1993

[51] Int. Cl.⁶ .................................................. G06F 5/01
[52] U.S. Cl. ................................................... 395/146
[58] Field of Search .................... 395/146, 148, 395/150–51; 345/179

[56] References Cited

U.S. PATENT DOCUMENTS

| 5,157,737 | 10/1992 | Sklarew | 382/13 |
| 5,231,698 | 7/1993 | Forcier | 395/146 |
| 5,347,295 | 9/1994 | Agulnick et al. | 345/156 |

OTHER PUBLICATIONS

O'Connor, Rory J., "Apple Banking on Newton's Brain", Apr. 22, 1992, San Jose Mercury News.
Weiman, Liza and Moran, Tom, "A Step Toward the Future", Aug. 1992, Macworld Magazine.
Soviero, Marcelle M., "Your World According to Newton", Sep. 1992, Popular Science Magazine.
Abatemarco, Fred, "From the Editor", Sep. 1992, Popular Science Magazine.

*Primary Examiner*—Heather R. Herndon
*Assistant Examiner*—Anton W. Fetting
*Attorney, Agent, or Firm*—Hickman Beyer & Weaver

[57] ABSTRACT

A method and apparatus for setting the case of text in a pen-aware computer system is described. In general, the case of one or more letters of a designated text object can be changed with a convenient and simple input gesture. The case resetting gesture takes the form of a substantially vertically extending line that overlies a textual object that includes a character or characters that are intended to have their case reset. The direction and position of the case setting gesture are used to determine which characters are to be affected and whether the designated case is upper or lower case.

12 Claims, 10 Drawing Sheets

RESETTING THE CASE OF TEXT ON A COMPUTER DISPLAY

BACKGROUND OF THE INVENTION

The present invention relates generally to computer systems, and more particularly to gestures for resetting the case of recognized text on a pen-based computer.

Computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, text and numeric information can also be entered into the pen-based computer system in a similar fashion.

One of the most common problems with text recognition is the misrecognition of the case of the input text. Correction of miscapitalization can involve the deletion and reentering of the text with no guarantee that such reentering will result in correct case recognition. Such steps are time-consuming and inefficient.

An example of a prior art change of case tool on a standard keyboard-based computer system, such as a Macintosh, is provided in Microsoft Word from Microsoft Corporation, of Redmond, Wash. A Change Case command can be selected from a pull-down menu or a dedicated command button to display a dialog box of options for changing the case of the text selected. Uppercase, lowercase, title case, sentence case, or toggle case commands can be selected from the list of options. The uppercase option changes the letters of the selected text from lower case to upper case. Conversely, the lower case option changes the letters of the selected text from upper case to lower case. Title case changes the initial characters of the selected text to upper case, while sentence case capitalizes the first word of the selected text. Toggle case functions as its name implies in changing all upper case letters to lower case and all lower case letters to upper case within the selected text. While these options provide a simple technique of altering the case of selected text, the aim is not to correct misrecognized text, since recognition is automatic on a keyboard-based system. Rather, the provision of a change of case command merely adds a word-processing tool within the application to enhance its functionality.

With the limit in size and screen space on a portable, pen-based system, use of a dedicated command button for changing the case of text input is extravagant and impractical. What is needed is a technique that provides functionality in allowing easy and efficient altering of the case of a textual object entered on a pen-based computer system.

SUMMARY OF THE INVENTION

In accordance with the purpose of the present invention, a method for setting the case of text in a pen-aware computer system is described. In general, the case of a single initial letter, or the case of all of the letters in a designated text object can be changed with a convenient and simple input gesture. The case setting gesture takes the form of a substantially vertically extending line that overlies a textual object that includes a character or characters that the user intended to reset the case of. The direction and position of the case setting gesture is used to determine which characters are to be affected and whether the designated case is upper or lower case.

In one preferred embodiment, when the case setting gesture overlies a first character in the overlaid textual object, only the case of the first character in the overlaid textual object is reset, whereas if the case setting gesture overlies any other character within the overlaid textual object, then the case of all of the characters in the overlaid text are changed. In another prefected embodiment, the case setting gesture can only be used to alter the case of preselected text. In another preferred embodiment, case setting gestures drawn in an upward direction are interpreted to require that the character(s) to be reset is/are set to upper case and case setting gestures drawn in a downward direction are interpreted to require that the character(s) to be reset is/are set to lower case. In still another preferred embodiment, a pen based computer system suitable for implementing these processes is described.

BRIEF DESCRIPTION OF THE DRAWINGS

The invention, together with further objects and advantages thereof, may best be understood by reference to the following description taken in conjunction with the accompanying drawings in which:

FIG. 3b is a view of the screen as in FIG. 3a that shows the capitalization result of the input gesture of FIG. 3a;

DETAILED DESCRIPTION OF THE PREFERRED EMBODIMENTS

The present invention is well suited for pointer based computer systems such as the pen-based, pen-aware and mouse controlled systems that are currently popular. For the purposes of illustration, the invention will be described in connection with a pen-based system.

Figure 1:
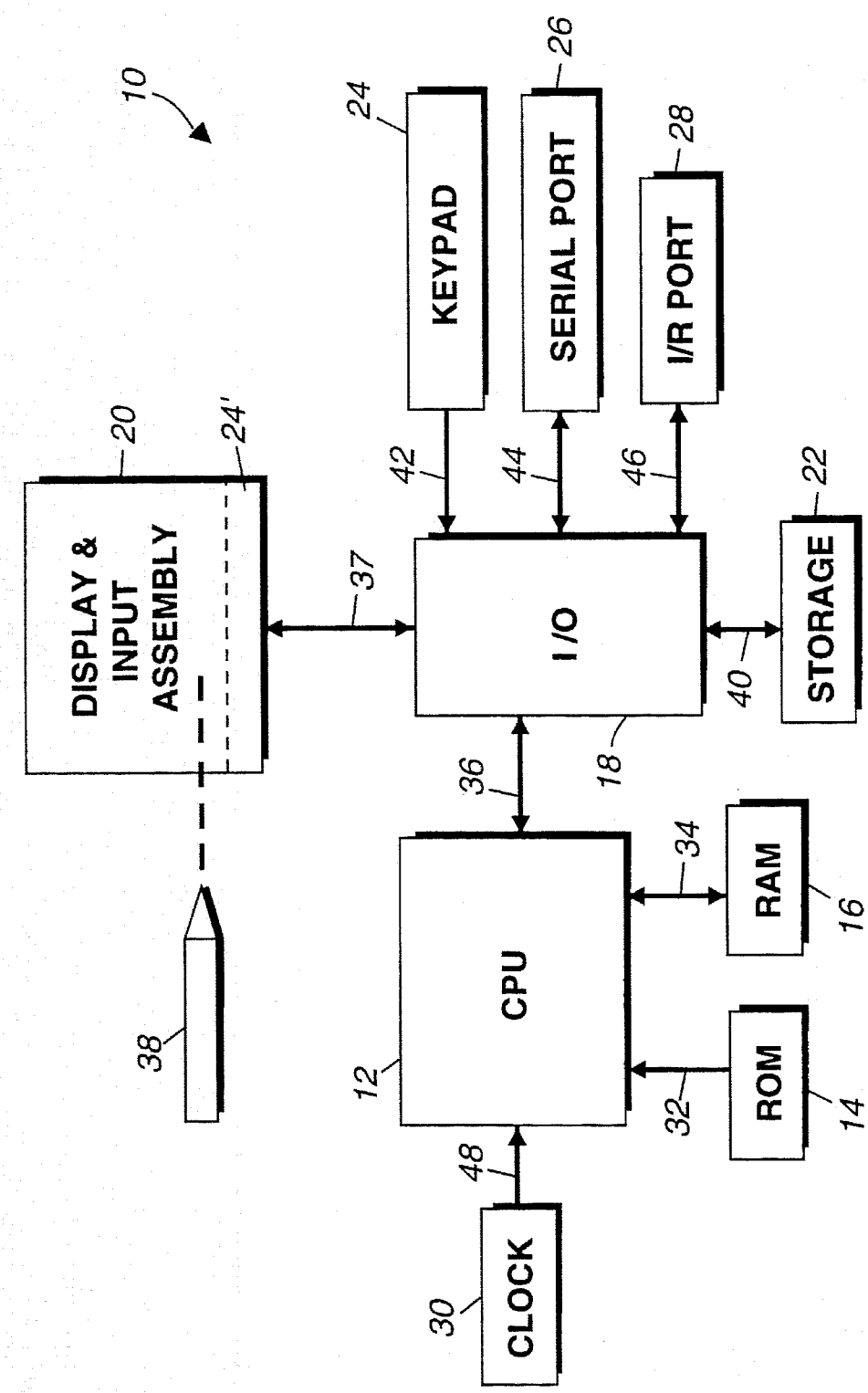
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
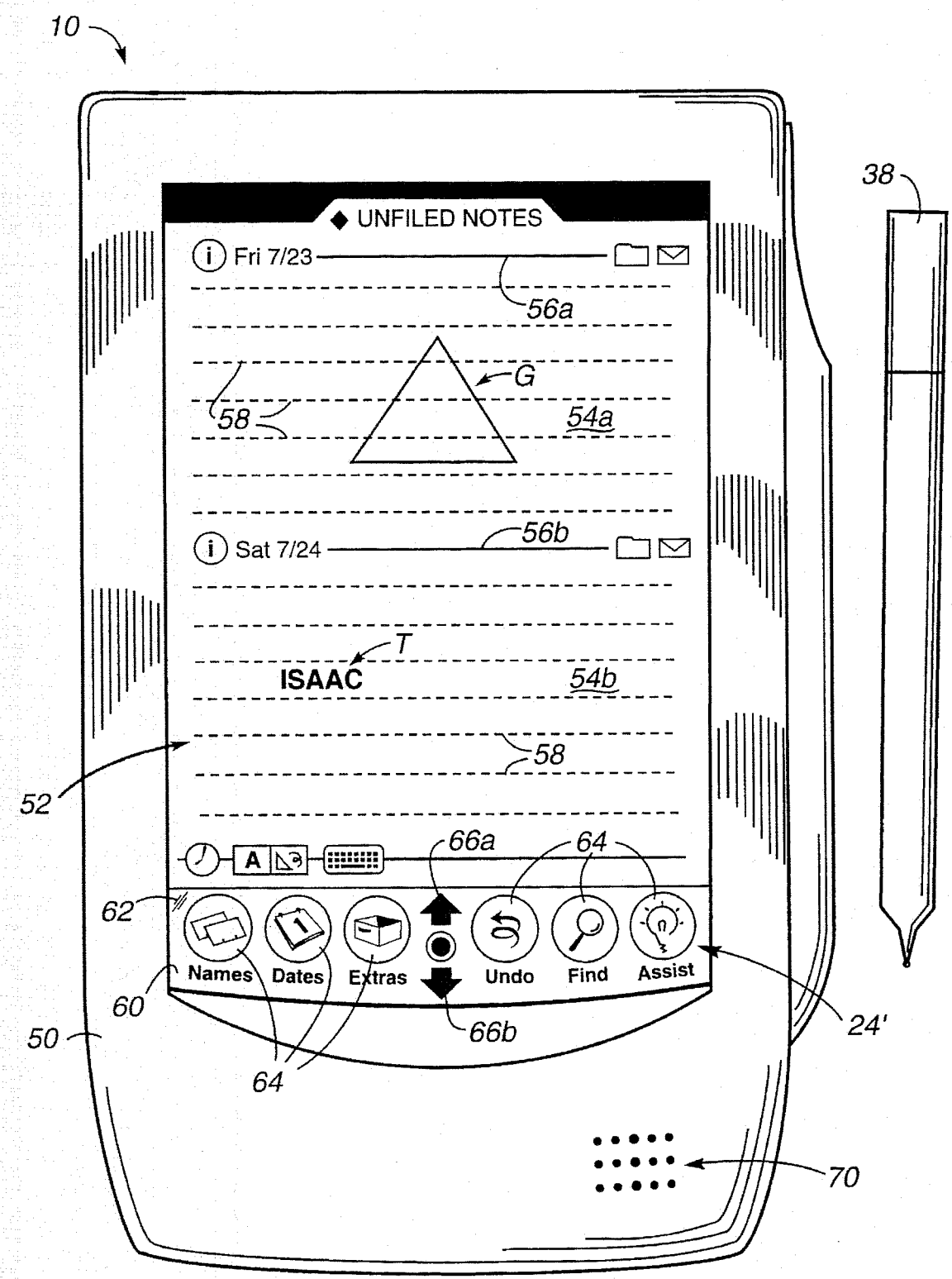
FIG. 2 is a top plan view of the screen, case, keypad, and stylus of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Examples of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 56a and 56b include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I. II. and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in co-pending U.S. patent application Ser. No. 07/976,970, which has been incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

FIGS. 3a–3d illustrate the screen appearance as the gestures for changing the case of text in accordance with the present invention are performed. In the described embodiment, a case change command requires the inputting of a combination of two gestures. That is, a selection gesture which selects a textual object, followed by a case setting gesture that takes the form of a substantially vertical line that is drawn through the selected textual object. The steps required to execute and interpret an attempt to change the case of the one or more letters within the selected textual object(s), will be explained more fully in the following description.

Figure 3B:
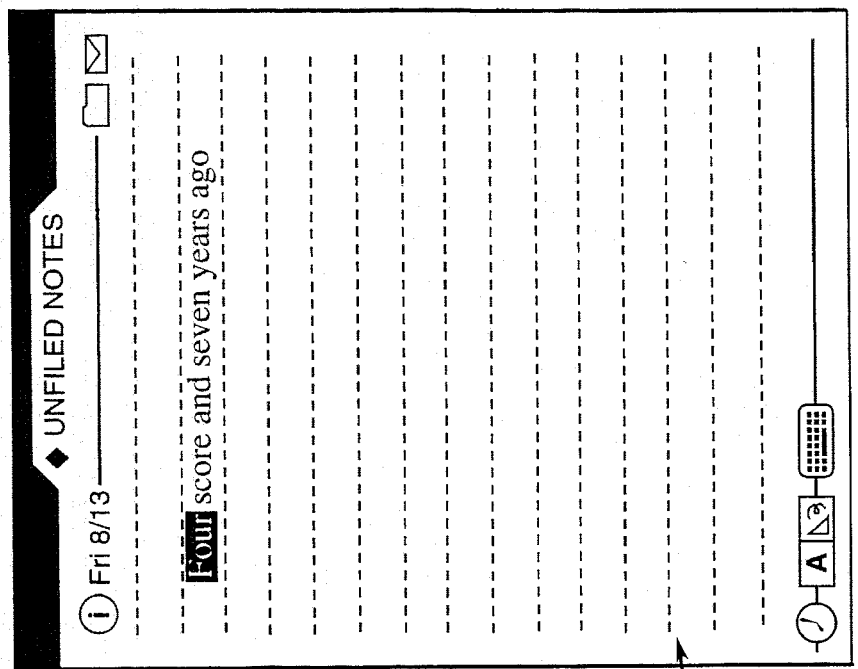
Figure 3A:
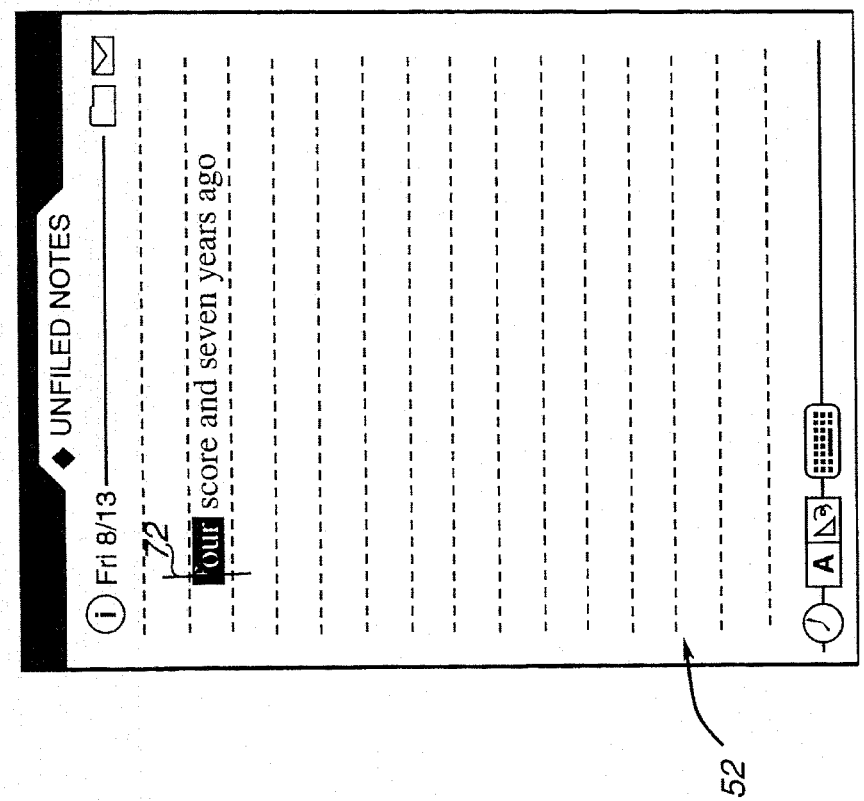
FIG. 3a is a view of the screen of FIG. 2 illustrating an input gesture over an initial letter of a word in accordance with the present invention.

FIG. 3a illustrates the screen of FIG. 2 with a note containing the recognized phrase "four score and seven years ago". The word "four" has been selected as indicated by the reverse highlighting of the word. Selection can be performed by any suitable selection gesture and/or command. By way of example, co-pending U.S. patent application, Ser. No. 07/888,741, filed May 26, 1992, on behalf of Capps, entitled "Method for Selecting Objects on a Computer Display", and assigned to the assignee of the present invention, describes a variety of suitable methods for selecting objects on a pen-based computer. That disclosure is incorporated herein by reference in its entirety. In one suitable selection gesture, the stylus is placed in contact with the screen 52 over the object to be selected and is held stationary for a short period of time. After a predetermined time period has passed, the computer switches into a selection mode. In the selection mode, any object that the stylus is moved across will be selected. Selection is often indicated by reverse shading of the selected object, so that for a text object that has been selected, the characters will appear as white on a black background as seen with the selected word "four" in FIG. 3a. Thus to select a particular word, the stylus is placed on the screen over one end of the word to be selected and held in place until the computer enters selection mode. Then, the stylus is moved over the word until the entire word is highlighted at which point the stylus is lifted from the screen. Selection is of course not limited to a single word, but selection of a single word has been chosen for illustrative purposes.

In the described embodiment, a set case gesture can only be input after an object has been selected. Thus, the following description presupposes that the user has selected an object. If no object is selected, then the process described below would not be initiated regardless of the user's actions.

On the other hand, it should be appreciated that the described process could readily be applied in environments where preselection is not required. In such a system it is generally desirable to put more stringent requirements on the height of the case setting gesture so as to differentiate the case setting gesture from the insertion of other characters such as the letters "i" or "l" or the number "1". Once an object has been selected, the system waits for the next input.

Upon completion of the selection, the input of a substantially vertical line gesture through the selected text indicates the intention to change the case of the selected text. The location and direction of the motion of the stylus as the line gesture is performed indicates the intended change. When the line gesture extends through the initial character of the selected text, then only the case of the initial character is reset. On the other hand, performing the line gesture through any other part of the selected text will cause the case of all the characters of the selected text to be reset. Moving the stylus in an upward motion while entering the line indicates the desire to change the letter(s) from lower case to upper case. That is, to capitalize the letters. Conversely, entering the line in a downward motion indicates the desire to change the letter(s) from upper case to lower case. Thus, a single gesture, the line gesture, is used to indicate several separate desired changes to the selected text object with the proper interpretation depending on the direction and location of the inputted line gesture.

In FIG. 3a, case setting line 72 is shown drawn in an upward direction through the letter "f" of the selected word "four" illustrating that a line gesture was performed over that letter. A line gesture is created by placing the stylus on the screen, moving the stylus either upward or downward in a substantially straight motion resulting in the "inking" of line 72 and then lifting the stylus from the screen. As mentioned previously, graphics software such as QUICK-DRAW is implemented to draw the line as the stylus is moved across the screen.

FIG. 3b illustrates the result after recognition of the upward case resetting line gesture shown in FIG. 3a which was drawn over the letter "f". As shown, the initial letter "f" of the word "four" has been capitalized so that the word now appears as "Four". This capitalization is the result of the line being input in an upward motion over the letter "f". The input of a line in a downward motion over the "f" would have produced no change in the case, i.e. the "f" would remain in lower case. Once capitalized, the word "Four" can be returned to "four" by again selecting the word and then entering a line in a downward motion over the letter "F".

Alternatively, the case of an entire selected word or series of selected words may be reset by merely changing the location at which the case setting gesture is input. By not drawing the line through the initial letter of the selected text, the entire selected text is affected, as shown and explained with reference to FIGS. 3c and 3d.

Figure 3D:
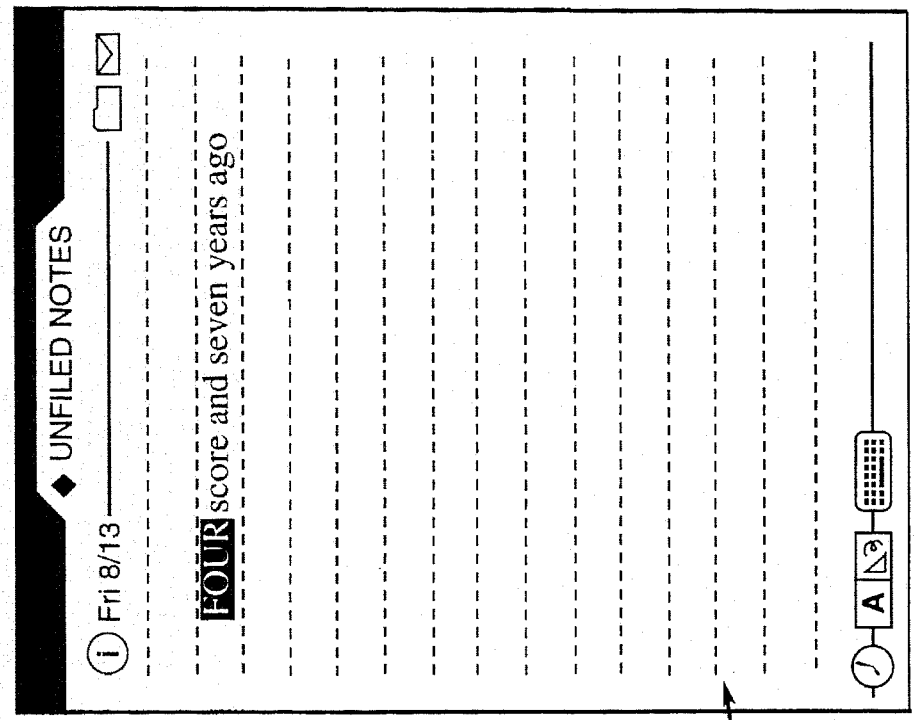
FIG. 3d is a view of the screen as in FIG. 3c that shows the change in case for the entire word as a result of the input gesture.
Figure 3C:
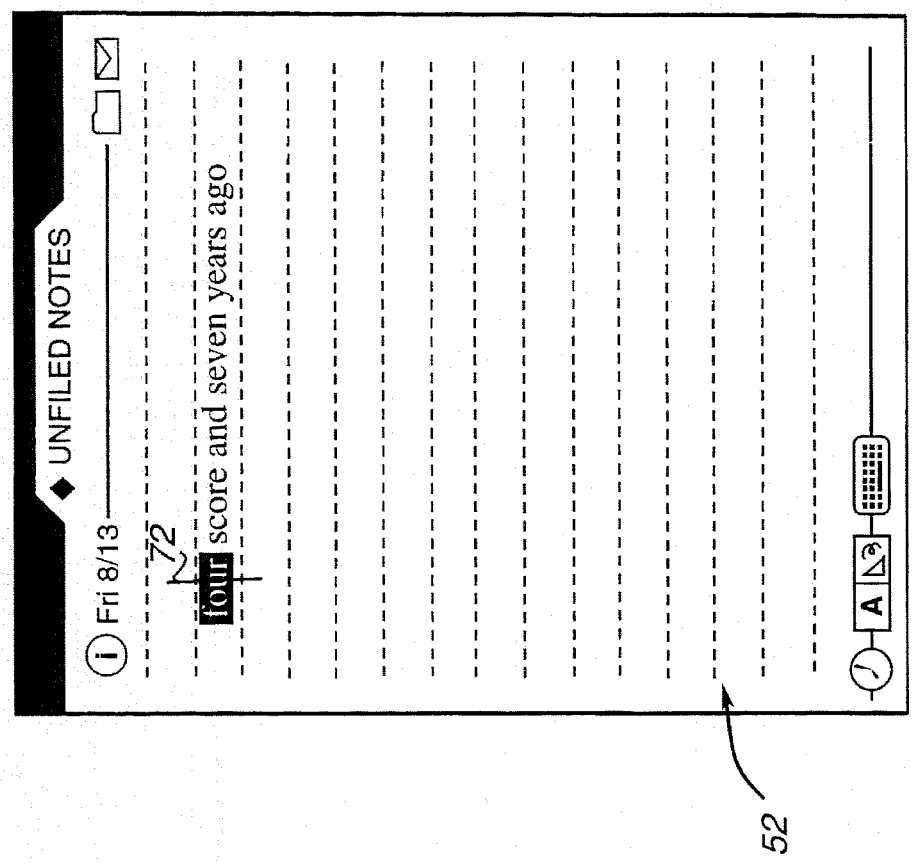
FIG. 3c is a view of the screen of FIG. 2 illustrating an input gesture over an entire word in accordance with the present invention.

FIG. 3c is similar to the screen shot shown in FIG. 3a, except that the location of the line 72 has changed. Again, the word "four" has been selected by a suitable selection gesture. In this case, however, line 72 was not drawn over the "f", but rather has been entered at a location after the initial letter. In all other respects, the line may be drawn as described previously with reference to FIG. 3a.

FIG. 3d shows the result after recognition of the upward case resetting line gesture shown in FIG. 3c. As illustrated, all of the letters in the word "four" have been changed from lower case to upper case. Again, this is a result of the input of the line in an upward direction. If a downward line had been input, the letters would have remained in lower case. Conversely, if one or more of the selected text had initially been upper case, a downwardly entered line would cause those letters to change from upper case to lower case. Letters that were originally lower case, would remain the same.

Figure 4:
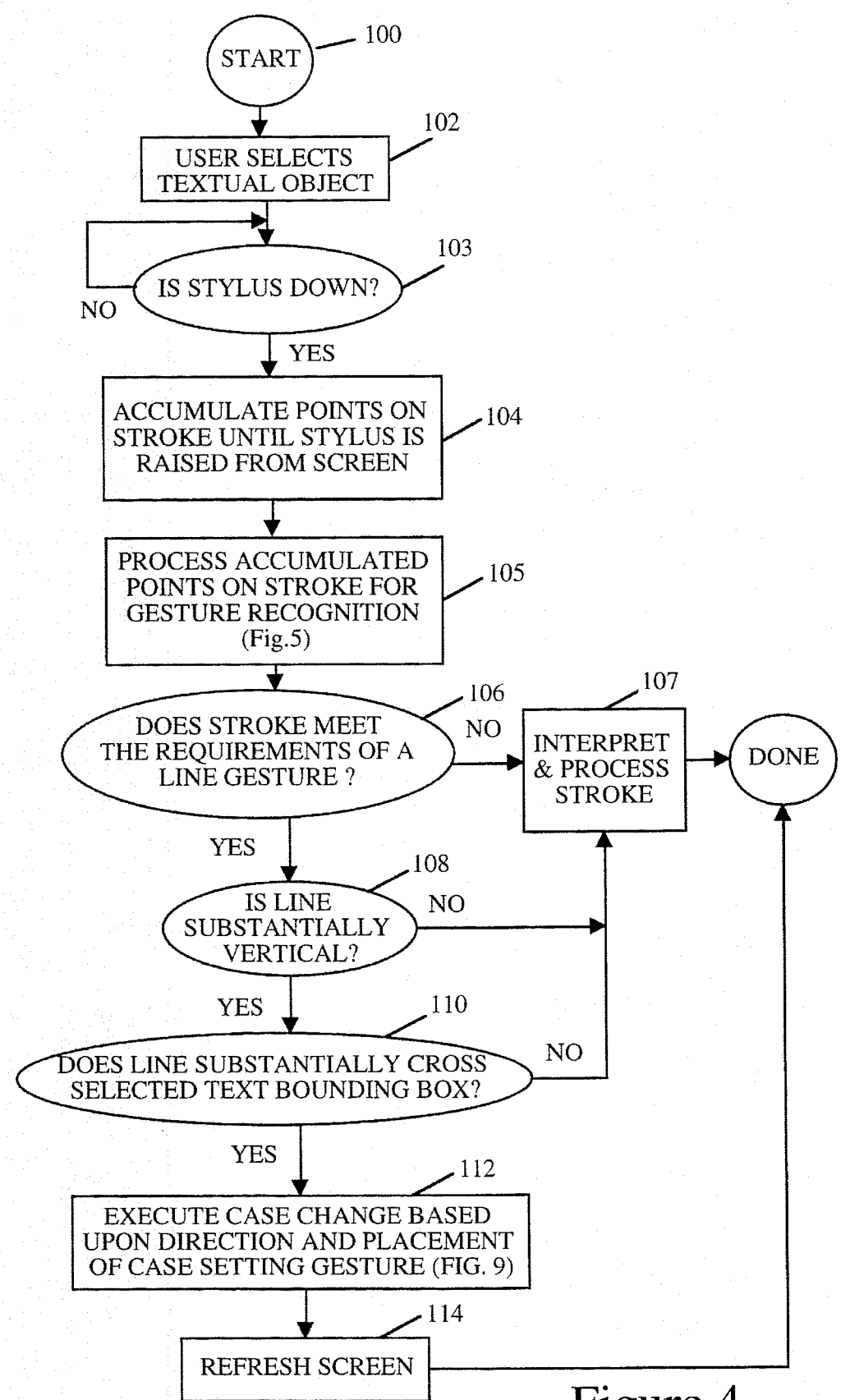
FIG. 4 is a flow diagram illustrating the steps of a method for producing the case changes illustrated in FIGS. 3b and 3d.

Turning next to the flow diagrams of FIGS. 4–9, a suitable method for resetting the case of objects displayed on the screen 52 as discussed above will be described in more detail. FIG. 4 is a flow diagram illustrating an overall method for producing the textual case changes shown in FIGS. 3a–3d. The process begins in step 100 and in step 102 a textual object is selected. It should be noted that a wide variety of gestures and/or commands can be used to accomplish the selection. By way of example, a variety of suitable selection gestures to select an object are described in more detail in co-pending U.S. patent application Ser. No. 07/888, 741, which has been incorporated herein by reference in its entirety. In one suitable selection gesture, the stylus is placed in contact with the screen 52 over the object to be selected and is held stationary for a short period of time. After a predetermined time period has passed, the computer switches into selection mode. In the selection mode, any object that the stylus is moved across will be selected. Selection is often indicated by reverse shading of the selected object, so that for a text object that has been selected, the characters will appear as white on a black background as seen with the selected word "four" in FIGS. 3a and 3c.

In the described embodiment, a case setting command can only be received after an object has been selected. Thus, the following description presupposes that the user has selected an object. If no object is selected, then the process described below would not be initiated regardless of the user's actions. After a textual object has been selected in step 102, the logic then moves to step 103 where it waits for the next user input. More specifically, the logic determines whether the stylus has been placed on the screen. If not, the logic waits. When an input is finally made, the logic proceeds to step 104 where the stroke made by the user is recorded. In practice, this is typically accomplished by generating a hardware interrupt when the user places the stylus 38 against the screen 52. The hardware interrupt gives control of the CPU 12 to the described routine. Thus, when the stylus 38 is placed on the screen the logic moves to step 104 where the path of the stylus is detected and recorded. In practice, this is accomplished by detecting and accumulating a series of points that define the stroke made by the stylus. After the stroke has been determined, the series of accumulated points that define the stroke are processed to support gesture recognition in step 105 as will be described in more detail below with reference to FIG. 5. After the stroke has been processed for gesture recognition in step 105, it is analyzed to determine whether the stroke is indeed part of a gesture and if so, the nature of the gesture. This step is represented by step 106 where the logic determines whether the stroke meets the requirements of a line gesture. In actuality, the logic would likely check for a wide variety of gestures. However, in the interest of simplicity, only the checks that are relevant to the present invention will be described herein. That is, the determination of whether the input has the appearance of a case setting gesture. Accordingly, other gestures will not be described herein. However, by way of example, the logic may be set up to check to determine whether a tap has been entered. If so, tap based gestures such as tap and drag gestures (which may, for example, be used to indicate a duplicate gesture as described in Tou et al's co-pending application Ser. No. 08/130,056 (Attorney docket No. APL1-P054), filed simultaneously herewith, which is assigned to the assignee of the present application and is incorporated herein by reference), double tap gestures (which may, for example, be used to bring up a list of alternative interpretations of a selected word) and/or other tap based gestures may be checked for.

If the stroke meets the requirements of a line gesture is step 106, then the logic proceeds to step 108 where it determines whether the line is substantially vertical. On the other hand, if the stroke does not meet the requirements of a line gesture, the logic proceeds to step 107 where it interprets the stroke or gesture and proceeds accordingly. Typically, the logic continues its attempt to identify whether the input is a gesture or command, and if is not recognized as such, the stroke is handled as an input. As part of step 107, the processed stroke may also be checked for a variety of other gestures such as caret gestures, open space gestures and scrub gestures such as those described in application Ser. No. 08/070,094, which is assigned to the assignee of the present application and is incorporated herein by reference. After such gesture recognition checking, it may be desirable to process the stroke in a different manner to support the recognition of other gestures as well. If the stroke is not recognized as a gesture, it may be treated as a separate input or a deselection command. Of course, there are a wide variety of meanings that can be attributed to a particular stroke. For example, the stroke may be a writing action, a drawing action, an editing action or a command, any of which may be recognized by suitable recognition software. However, to the extent that such writing, drawing, editing and processing actions do not relate directly to the present invention they will not be described herein.

When the determination of step 106 is that the stroke meets the requirements of a line gesture, the logic continues with step 108 to determine if the line input is substantially vertical. In order to be considered substantially vertical, as determined in step 108, there should preferably be no more than a ten to twenty degree difference between the input line and the vertical, i.e. Y-axis, as defined by the coordinate system for the notepad application in the view system. By way of example, permissible variations of up to twenty degrees from vertical has been found to work well in defining a substantially straight line. This determination is quite simple. Specifically, the logic looks at the beginning and end points of the processed stroke and determines whether the line drawn therebetween forms less than a 20 degree angle with the Y-axis. If not, the line is not considered to be substantially vertical, and the potential line gesture is not a case setting gesture. In this circumstance, the logic goes to step 107 where the input is interpreted appropriately. It should be appreciated that the system may be set up to attribute a different meaning to non-vertical line gesture. However, since such potential interpretations are not relevant to the present invention, they will not be described herein.

If the line is determined to be substantially vertical, the method continues with step 110 in which the height of the bounding box of the selected text is compared with the length of the input line. In the embodiment shown in FIG. 3a, this would correspond to the darkened area about the highlighted word "four". It is noted that with the word "four", the bounding box is rectangular. Although it is common to have rectangular bounding boxes, that is not a requirement. Rather, in some circumstances the bounds may reflect the shape of the object(s) selected. To be a valid line input that triggers the continuation of the case alteration process for the selected text, the line should pass substantially completely through the selected text. If the length of the line is shorter than the height of the selected text's bounding box by more than a predetermined amount, or the length of the line is longer than a predetermined length, the line gesture is not interpreted as a case setting gesture. In this case, the logic returns to step 107 so that the input can be handled by the appropriate system logic. By way of example, the y-coordinates of the line are compared with the y-coordinates of the selected text's bounding box to determine if the line passes substantially completely through the bounding box. To determine if the line is longer than a predetermined length, the length of the line is compared to a length of fifty pixels and to a length equal to three times the height of the selected text's bounding box. These limitations have been found to work well in determining that the line is not too tall for the ranges of text sizes. Again, lines that are too long are considered part of another gesture and are handled appropriately in step 107. If the length of the line is less than three times the height of the bounding box or is less than fifty pixels, and passes substantially completely through the selected text's bounding box, then the input is considered to be a case setting gesture and the logic continues with step 112.

In step 112, a case setting gesture is executed which sets the case of at least a portion of the selected text. The actual character(s) that is/are subject to the case change are determined on the basis of the direction and placement of the case setting gesture relative to the selected text as discussed above with reference to FIGS. 3a–3d. As stated with reference to those figures, a line drawn through the first character changes the case of that character only. A line drawn through any other part of the selected text changes the case of all the letters of the selected text. To be considered over the first character only, the line must be drawn within the left and right edges of the bounds of the first character or within six pixels of the left edge of the first character, otherwise the line is considered to affect the entire selected text. These bounds for the initial character are given by the view system and vary depending upon the font and character size of the recognized text. In the case of either an initial character change or a multiple character change, the next sets of steps determine the direction of the input line and the resultant change in case. This portion of the process will be described in more detail below with reference to FIG. 9.

After the case has been changed, the case selection process is completed. In the described embodiment, the selected textual object remains selected. Thus, if the user has inadvertently entered a case setting gesture, the gesture can be corrected immediately. Further, other gestures that require the text to be selected can be executed. To deselect the highlighted textual object, the user needs only to tap the stylus on the screen at a location completely outside of the selected text. However, in alternative systems, the highlighted item could readily be deselected at the end of the case change gesture.

Figure 5:
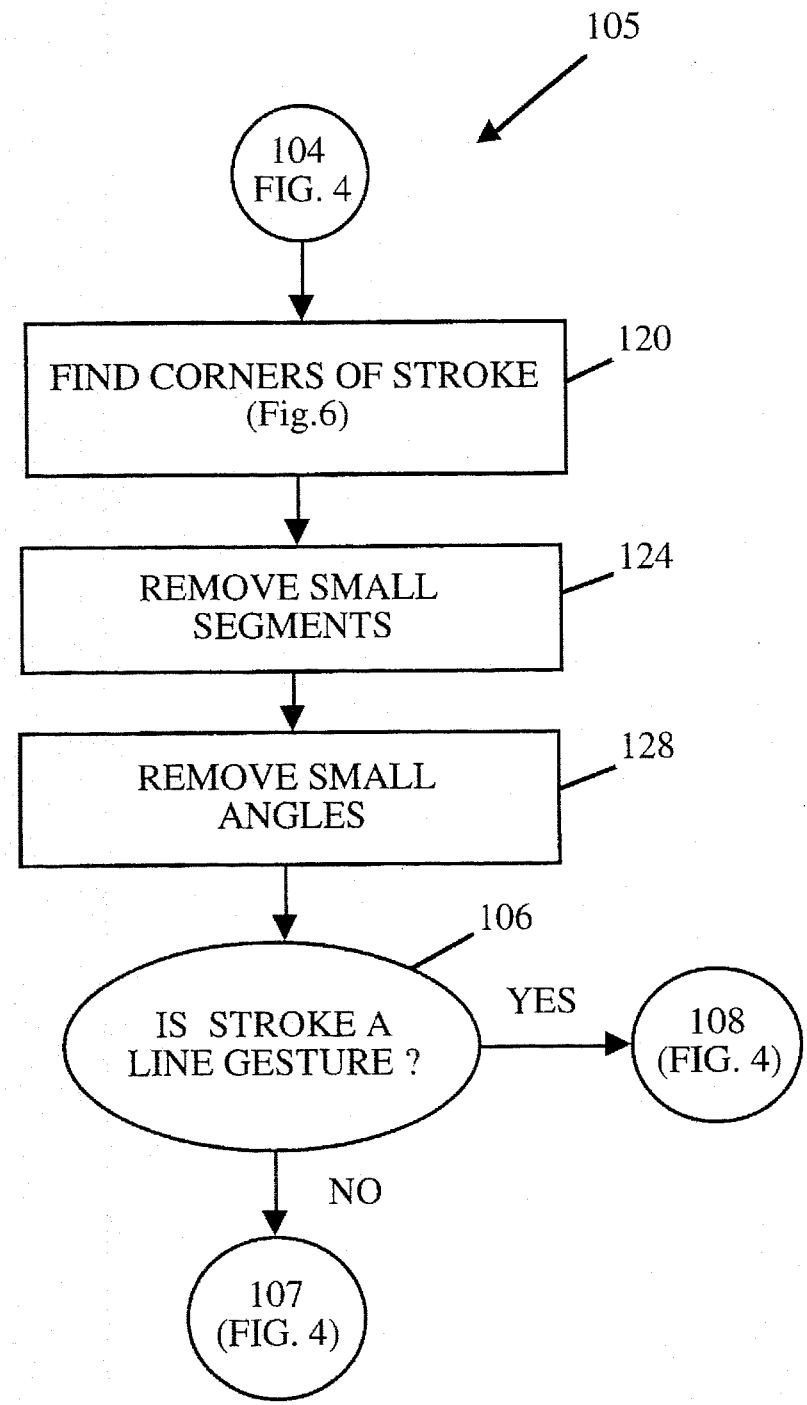
FIG. 5 is a flow diagram illustrating a method of processing stroke information for gesture recognition.

Turning next to FIGS. 5–8, a suitable method for processing the stroke for gesture recognition (i.e. step 105 in FIG. 4) will be described in more detail. Referring initially to FIG. 5, after the stylus 38 is lifted from the screen at the end of step 104, the corners of the stroke are first determined in step 120. In effect, the corner defining technique breaks the stroke into a series of straight line segments that approximate the curved path of the inputted stroke. In practice, the processed stroke would typically not be displayed. Rather, it is processed as a series of points internally within the CPU 12. The details of the corner defining step 120 will be described in more detail below with reference to FIG. 6.

After the corners have been defined, any line segments that are shorter than a predetermined threshold length are removed by merging them with an adjacent segment. This small segment removing step 124, will be described in more detail below with reference to FIG. 7. After the short segments have been removed in step 124, any corners which create a turn that is less than a predetermined threshold turn angle is eliminated in step 128. The small turn angle corner removing step will be described in more detail below with reference to FIG. 8.

By merging the small segments with adjacent segments and removing corners having small turn angles, the system processes the user input into a form that is suitable for gesture recognition. In applicant's experience, these steps greatly improve the system's reliability and ease of use. The reason is that as will be appreciated by those familiar with pen-based input systems, the "handwriting" of most users is not particularly neat. Therefore, it is helpful to preprocess the input before gesture recognition. By utilizing rather substantial preprocessing, the input can be checked for its compliance with a variety of different gestures. The applicants have found that by processing the strokes in the described manner, the system has a good degree of tolerance for variations in the handwriting of a variety of users.

After the original stroke has been processed into a gesture recognizable form in steps 120–128, the logic moves to step 106 where it determines whether the stroke is a line gesture. This is accomplished by checking whether there are just two points in the processed stroke. If the stroke has just two processed points, then the logic proceeds to step 108 as described above with reference to FIG. 4. On the other hand, if the processed stroke has more than two points, it is not a line gesture and the logic moves to step 107 as previously described. Within step 107, the logic may check to see whether the processed stroke resembles a caret, open space or scrub gesture.

Figure 6:
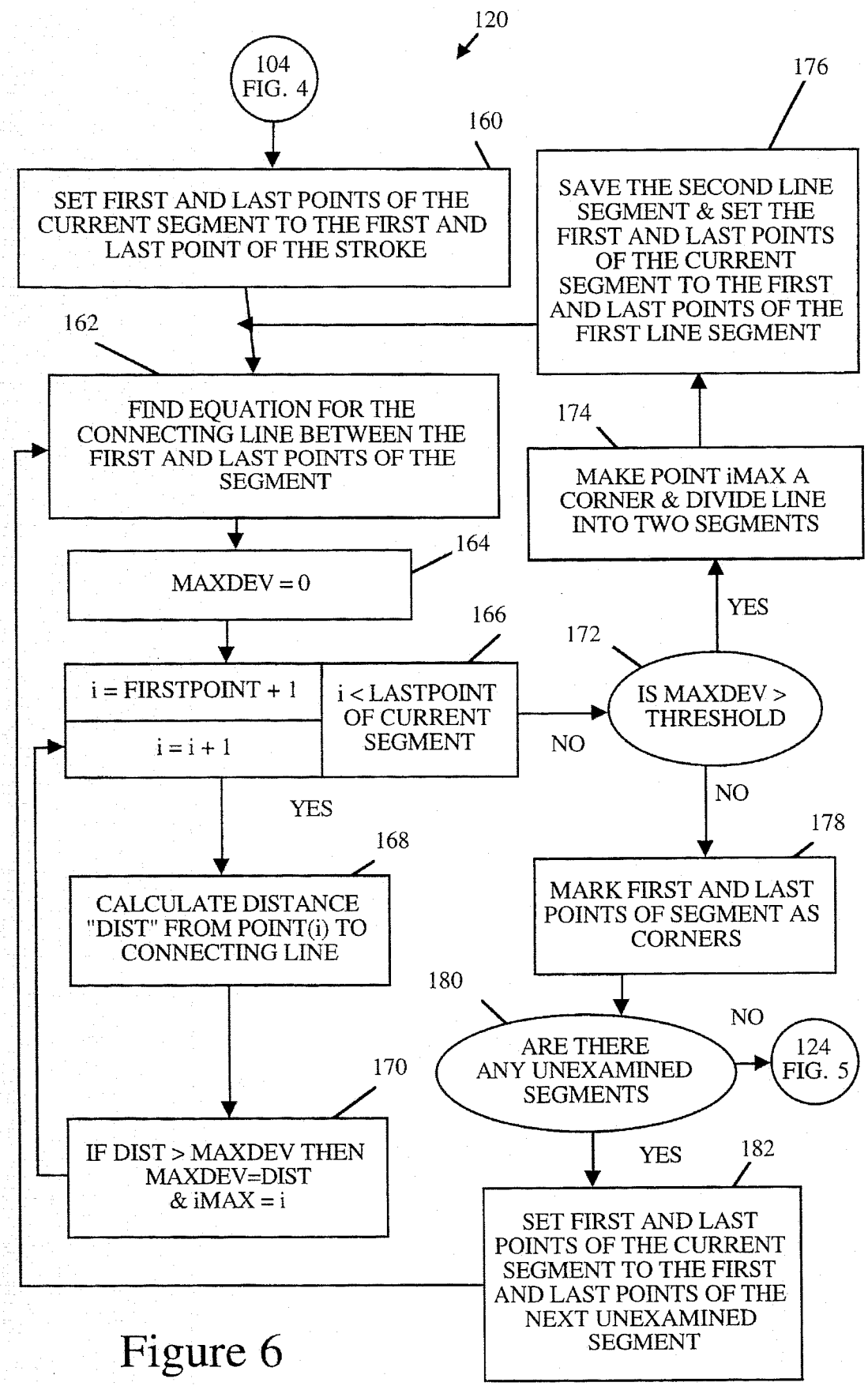
FIG. 6 is a flow diagram illustrating a method of determining the corners of a stroke to facilitate gesture recognition.
Figure 7:
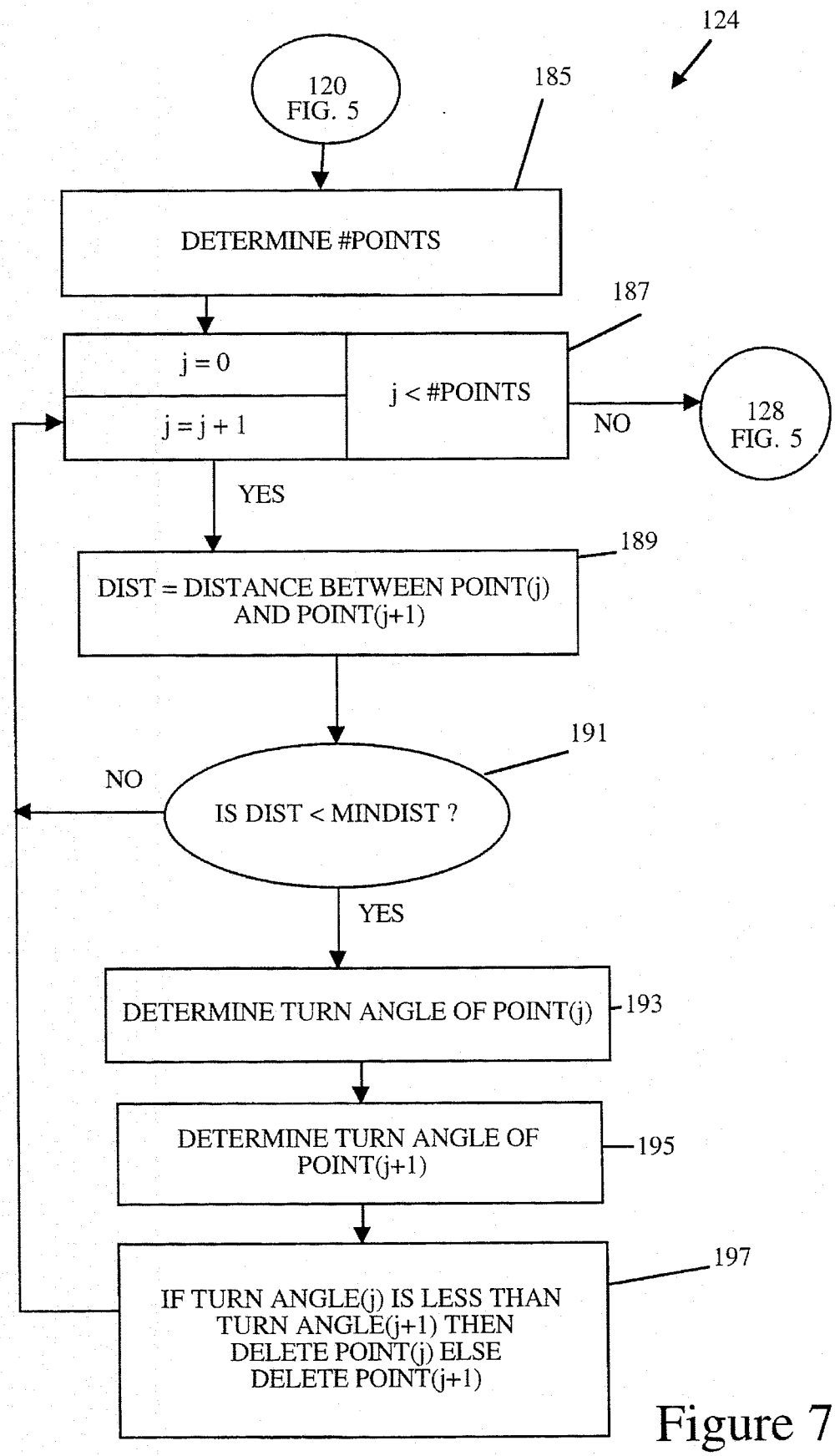
FIG. 7 is a flow diagram illustrating a method of removing small line segments from a stroke to facilitate gesture recognition.
Figure 8:
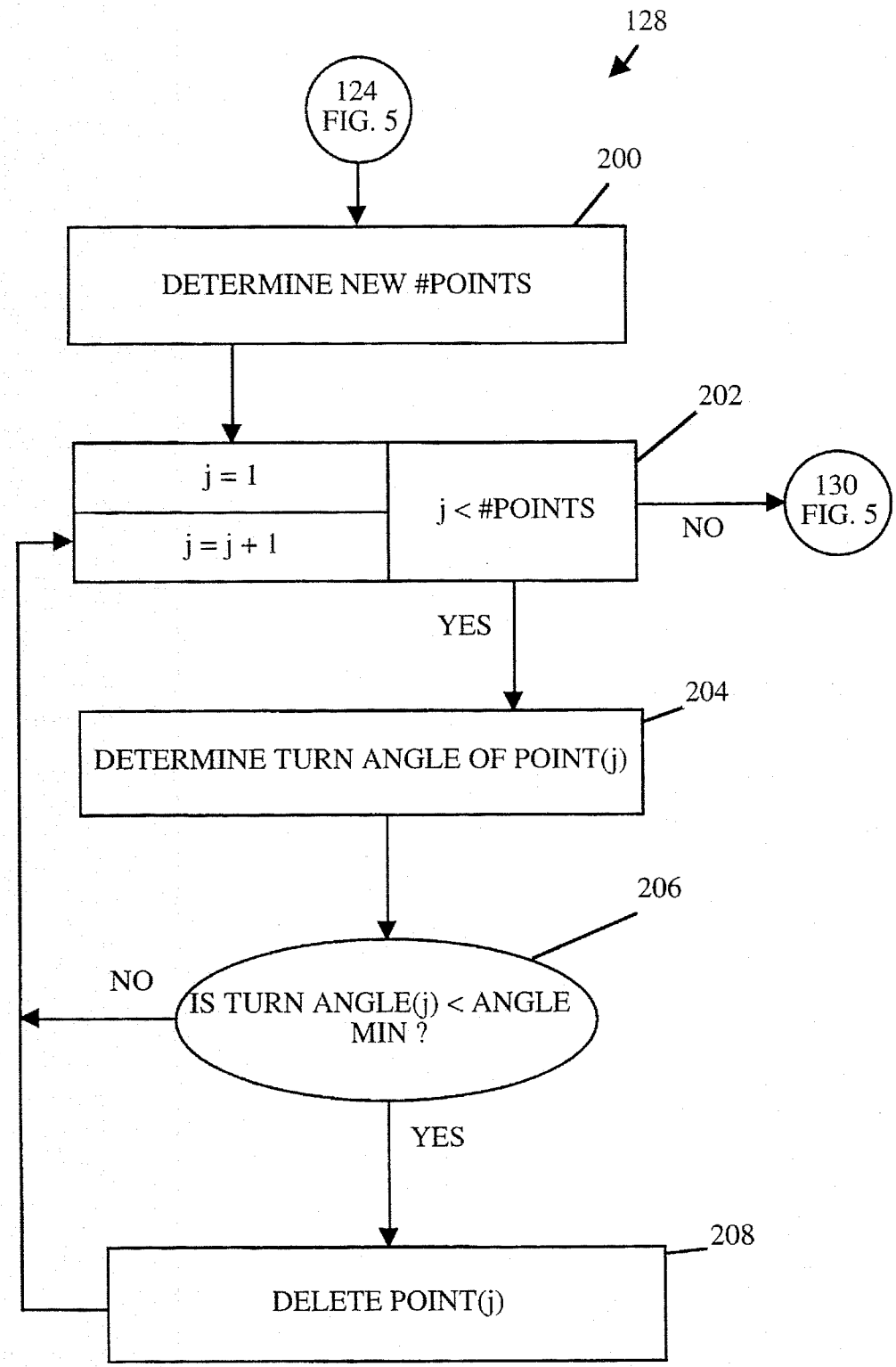
FIG. 8 is a flow diagram illustrating a method of removing small variations in the direction of a stroke to facilitate gesture recognition.

Turning next to FIG. 6, the corner identification technique of step 120 will be described in further detail. Conceptually, an imaginary line is drawn between the first and last points in the stroke. Then the remaining points in the stroke are compared to the position of the imaginary line to determine which point is furthest from the line. If the point that is furthest from the line is more than a predetermined offset distance away from the imaginary line, then it is defined as a corner point. The process is then recursively repeated on each line segment until a set of processed points is developed wherein none of the actual points on the line segment input by the user are further than the predetermined threshold offset distance from the adjacent line between corner points. The mathematical technique used to implement this approach is described by Duda & Hart in their text *Pattern Classification and Scene Analysis*, published by John Wiley & Sons, 1973, which is incorporated herein by reference. Naturally, the appropriate threshold offset distance will vary somewhat depending upon the particular system. In the hand held pen-based computer system of the described embodiment, a suitable threshold offset distance is in the range of 2 to 6 with 4 being a representative appropriate offset. It is sometimes desirable to vary the length of the offset based upon the size of the stroke.

As seen in FIG. 6, the technique begins at step 160 where the first and last points of the initial segment that is to be processed looking for a corner (Current Segment) are set to the first and last points of the entire stroke. Then in step 162, the CPU 12 determines the equation for an imaginary connecting line that extends between the first and last points of the current segment. After the imaginary line has been calculated, the value MAXDEV is set to zero in step 164. In the loop that follows in steps 166–170, the value MAXDEV will be used to store the distance of the point that is farthest from the imaginary line. In step 166 a loop is initiated to determine which point is furthest from the imaginary line. A counter "i" is set to the value of the first point in the current segment plus one. Thus, the initial point that is checked is the point that is next to the first point. In step 168, the distance DIST from point (i) to the imaginary connecting line is calculated. Then in step 170, the value calculated for DIST is compared to the value MAXDEV. If the value of DIST is greater than MAXDEV, then the point (i) is the furthest point from the imaginary line that has been calculated so far, and the value MAXDEV is reset to equal DIST and a value iMAX is set equal to the current counter value "i". Thereafter, the logic loops back to step 166 where the counter "i" is incremented and the incremented counter value is compared to the point number of the last point in the current segment. As long as the value of counter "i" is less than the point number of the last point in the current segment, the loop including steps 168 and 170 is repeated. In this manner, the point furthest from the imaginary line can be readily determined.

After all of the intermediate points have been checked, the value of counter "i" is incremented to the number of the last point in the current segment and the logic moves to step 172 where it determines whether MAXDEV is greater than a predetermined threshold as described above. If so, point iMAX is designated as a corner and two line segments that are created between the corner and the respective first and last points of the current segment are created in step 174. Then in step 176, the first of the new line segments is set to the current line segment and the second new line segment is saved for a recursive analysis at a later point. After step 176, the logic returns to step 162 where the process is repeated until the value MAXDEV of a particular line segment is less than or equal to the predetermined threshold value.

When the value MAXDEV associated with a particular line segment is less than or equal to the predetermined threshold value, the first and last points of the current segment are marked as corners in step 178. Then in step 180, the logic checks to determine whether there are any unexamined segments. If not, the logic proceeds to the small segment removing step 124 (in FIG. 5). If there is an unexamined segment, the first and last points of the current segment are set to equal the first and last points of the next unexamined segment in step 182. Then the logic returns to step 162 where the entire process is repeated until the entire stroke has been broken into small enough line segments so that none of the line segments deviate from the original stroke by more than the predetermined threshold offset. It is noted that the processed stroke constitutes a series of corner points.

After the corner points have been defined in step 120, any line segments that are very small are merged with adjacent line segments in step 124. The small segment removing step 124 will be described next with reference to FIG. 7. Initially, in step 185, the total number of points that were defined in the corner finding step 120 is determined. In practice, it is easiest to maintain a counter which counts the total number of points, #points that are in the processed stroke. The counter can be initialized and incremented in step 120 as the various end points and corners are being defined. After the number of points have been defined, a loop is set up which measures the distance between each adjacent pair of points. The loop begins in step 187 with the starting point being point (0). Thus a counter "j" is initialized to zero. Then in step 189, the distance DIST between two adjacent points [e.g. point (j) and point (j+1)], is determined. If the distance DIST is greater than or equal to a predetermined minimum distance MINDIST, then the logic returns to step 187 where the counter "j" is incremented by one and the loop is repeated. On the other hand, if the distance DIST is less than the predetermined minimum distance MINDIST, then the logic moves to step 193 where it calculates the turn angle of point (j) [Turn Angle (j)]. Of course, the appropriate value for MINDIST can vary a great deal depending upon the nature of the objects being deleted, the screen size, etc. For the hand held pen-based computer system of the described embodiment, the applicant has found a value of 8 pixels to work well. This, again, can vary based upon the size of the stroke.

In step 193, the logic calculates the number of degrees that the processed stroke turns at point (j). Thereafter, in step 195 the turn angle of point (j+1) is calculated. After the turn angles of both points have been calculated, the point that has the smaller turn angle is deleted in step 197. That is, if Turn Angle (j) is less than Turn Angle (j+1), then point (j) is deleted. If not, point (j +1) is deleted. The only exception to this is that the end points are never deleted. After one of the points associated with a small line segment is eliminated, the logic loops back to step 187 where the counter "j" is incremented and the incremented value is compared to #points. If "j" is less than the value #points, then the loop is repeated. For the purposes of the flow diagram shown in FIG. 7, when a point is deleted, the remaining point is considered point (j+1). If the value of counter "j" is incremented so that it equals #points, then the small segment removing step 124 is completed and the logic proceeds to step 128.

After the small line segments have been removed in step 124, any remaining points that have a turn angle that is smaller than a predetermined minimum turn angle are eliminated as well in step 128. This step will be described in more detail with reference to FIG. 8. Initially, in step 200, the number of points (#points) that remain after the small segment have been removed are counted. Then, in steps 202–208, a loop is created which eliminates the corners that have small turn angles. Initially, in step 202, the loop is created and a counter "j" is set equal to one. Then in step 204, the logic determines the turn angle of point(j) [Turn Angle(j)]. In step 206, the calculated Turn Angle(j) is then compared to a predetermined minimum turn angle ANGLEMIN. If the turn angle of the current point is less than the predetermined minimum turn angle, then point(j) is deleted in step 208. Otherwise, the logic loops back to step 202 where the counter "j" is incremented by one. Similarly, after a point is deleted in step 208, the logic loops back to step 202 to increment the counter "j". After the counter has been incremented, it is compared to the value #points. So long as the value in counter "j" is less than #points, the loop continues. On the other hand, if the value of counter "j" is not less than the value of the #points, the loop is terminated and the logic proceeds to step 106 as discussed above with reference to FIG. 4.

Figure 9:
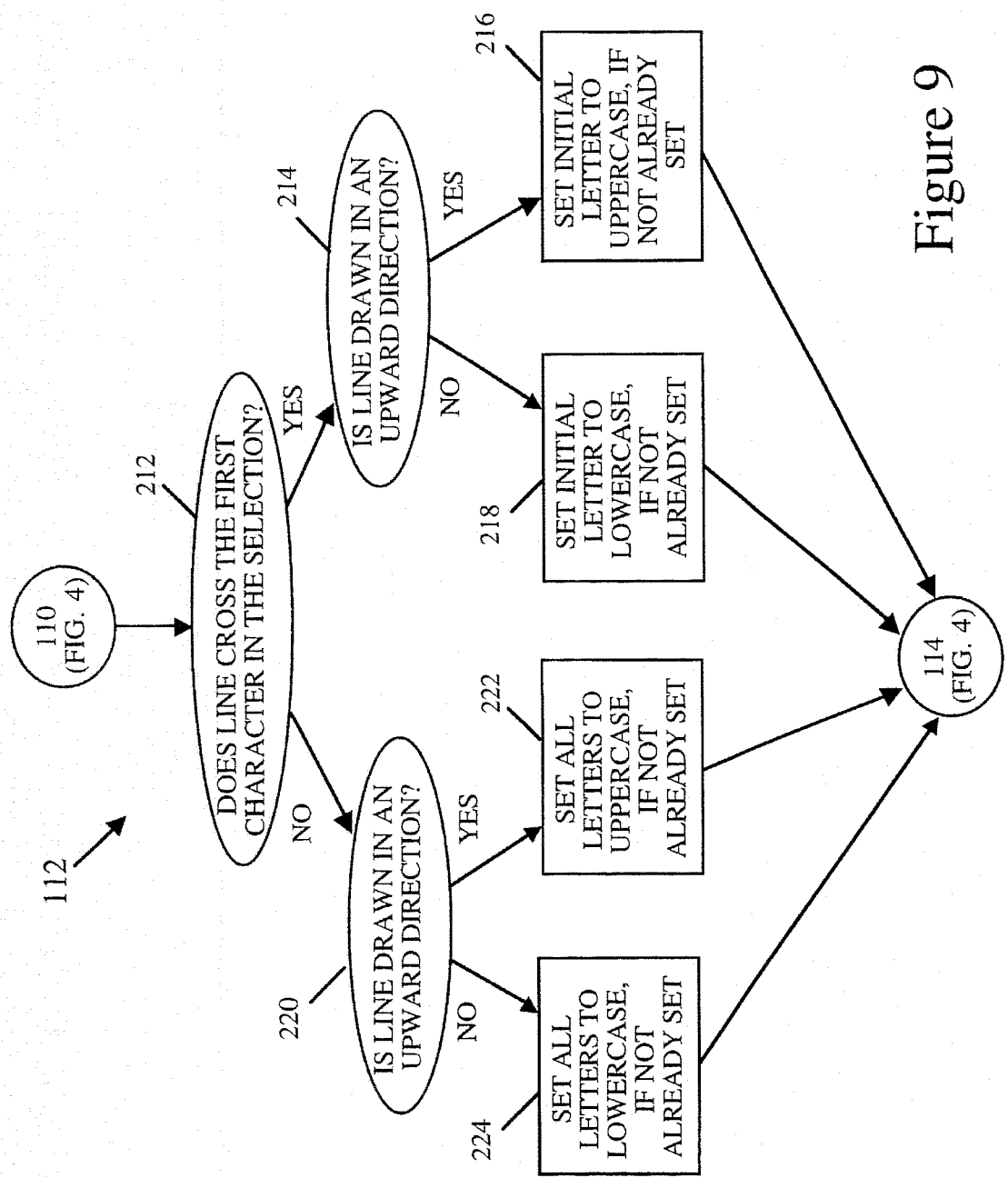
FIG. 9 is a flow diagram illustrating a method of determining the character(s) whose case is to be reset based upon the direction and placement of the case setting gesture.

Referring next to FIG. 9, the step 112 of resetting the case of selected text based upon the direction and placement of the case setting gesture will be described in more detail. Initially, in step 212, the logic determines whether the case setting gesture is drawn across the first character in the selected text string. If the case setting gesture is drawn through the first character in the selected object, then only the case of that character is changed. On the other hand, a case setting gesture drawn through any other part of the selected text changes the case of all of the letters of the selected text. To be considered over the first character only, the line must be drawn within the left and right edges of the bounds of the first character or within six pixels of the left edge of the first character. These bounds for the initial character are given by the view system and vary depending upon the font and character size of the recognized text.

If the case setting gesture is determined to have been drawn over the first character in the selected text, then the logic proceeds to step 214 which determines whether the line is drawn in an upward direction. This is accomplished by checking to see whether the beginning point in the line is below the final point in the line. If it is, (i.e. the line has been drawn upwardly through the first character) then the user has indicated a desire to set the initial letter to upper case. Typically this would only be done when the letter is currently lower case. The actual case resetting is performed in step 216. On the other hand, if the gesture was drawn in a downward motion it is interpreted as an attempt to set the initial character to lower case which is accomplished in step 218.

Determination of the direction of the line involves determining the angular orientation of the line as stored in the recognition of the line. For an upwardly drawn, substantially vertical line, i.e. moving the stylus from a lower position to a higher position on the screen, the angular orientation would be 0° for a coordinate system defined with the positive y-axis as 0° and the positive x-axis as 90°. Conversely, with this defined coordinate system, the angular orientation would be 180° for a downwardly drawn, substantially vertical line indicating that the stylus has been moved from a higher position to a lower position in a substantially straight motion on the screen. As mentioned above with reference to FIGS. 3*a* and 3*b*, the input of an upwardly drawn line over an already capitalized letter or a downwardly drawn line over an already lower case letter results in no change to the case of the letter.

If the result of step 212 is negative, (i.e. that the line was not drawn through the first character), then the logic moves to step 220, which determines whether the line was drawn in an upward manner. This step is identical to step 214 and indeed the same code would typically be used. If the case setting gesture is drawn in an upward direction, the logic continues with step 222 and all of the characters in the selected text string that are not already in upper case are changed to upper case. On the other hand, if the case setting gesture is drawn in a downward manner, i.e. the result of step 220 is negative, all of the characters that are not already in lower case are changed to lower case in step 224. The changing of the case of the character(s) involves updating the character(s) stored in the frame system. Upon completion of any one of steps 216, 218, 222, or 224, the process for changing character case is completed, and the logic proceeds to step 114 where the screen display is refreshed to display the changes made. The system then returns to step 100 where it waits for the next user input, command, or gesture. Again, in the described embodiment, the selected text will remain selected after the case change has been made. However, in alternative embodiments, the selected text could be deselected.

While this invention has been described in terms of a preferred embodiment, it should be understood that the present invention may be embodied in many other specific forms without departing from the spirit or scope of the invention. For example, in the described embodiment, only entire words are selected, but in an alternate embodiment, single characters could be selected and their case changed by an upwardly or downwardly entered line. Further, the described embodiment contemplates requiring the text to be selected the case setting gesture can be used. In other embodiments, it would be possible to additionally or alternatively use the case setting gesture on unselected letters and/or words as well.

Additionally, a specific line processing technique has been described for use in conjunction with the gesture recognition. However, it should be appreciated that alternative processing or analysis could be used as well. From the foregoing, it should be apparent that the present examples are to be considered as illustrative and not restrictive and the invention is not to be limited to the details given herein, but may be modified within the scope of the appended claims.

We claim:

1. A method for setting the case of a selected textual object displayed on a display screen of a pen-based computer system, the method comprising the steps of:

receiving a stroke input on the display screen;

determining whether the stroke is a case setting gesture that is formed from a single substantially vertical line that intersects the selected textual object, and does not include a significant horizontal component; and setting the case of at least one character in the intersected selected textual object based upon the direction that the case setting gesture is drawn and the location at which the gesture is drawn relative to the intersected selected textual object when the stroke is determined to be a case setting gesture.

2. A method as recited in claim 1 wherein when the stroke is determined to be a case setting gesture, the method further comprises the step of determining whether the case setting gesture crosses a first character in the overlaid textual object, and wherein when the case setting gesture does cross the first character in the overlaid textual object, only the case of the first character in the overlaid textual object is reset.

3. A method as recited in claim 1 wherein the step of determining whether the stroke is a case setting gesture includes the substeps of determining whether the substantially vertical line overlies a preselected segment of text, wherein the input must overlie a preselected segment of text for the stroke to be considered a selection gesture.

4. A method as recited in claim 1 wherein case setting gestures drawn in the upward direction are interpreted to require that a selected portion of the overlaid text be set to upper case and case setting gestures drawn in the downward direction are interpreted to require that the selected portion of the overlaid text be set to lower case.

5. A method for setting the case of a textual object displayed on a display screen of a pen-based computer system, the method comprising the steps of:

selecting a textual object displayed on the display screen;

receiving an input stroke on the display screen;

determining whether the stroke is a case setting gesture that takes the form of a single substantially vertical line that intersects said selected textual object, and does not include a significant horizontal component;

determining whether the line intersects a first character in said selected textual object;

resetting the case of the first character in said selected textual object to either upper or lower case based at least in part upon the direction said input stroke is drawn when the stroke is identified as a substantially vertical line that intersects said selected textual object; and wherein the case of said first character is set to upper case when said line is determined to extend vertically upward through such that said first character is intersected, and the case of said first character is set to lower case when said line is determined to extend vertically downward through such that said first character is intersected.

6. A method for setting the case of a textual object as recited in claim 5 wherein the case of all of the characters in said selected textual object are set to the same level when said line is determined to extend substantially vertically over said selected textual object at a location other than said first character.

7. A method for setting the case of a textual object as recited in claim 6 wherein the resetting step includes the substep of setting all of the characters in said selected textual object to upper case when said line is determined to extend substantially vertically upward over said selected textual object in a location other than said first character.

8. A method for setting the case of a textual object as recited in claim 6 wherein the resetting step includes the substep of setting all of the characters in said selected textual object to lower case when said line is determined to extend substantially vertically downward over said selected textual object in a location other than said first character.

9. A computer system including processing means for controlling operation of the computer system, a touch sensitive display screen and a stylus for inputting information to the processing means by touching the stylus to the screen and moving the stylus across the screen comprising:

means for detecting when a case setting gesture is inputted by the user, the case setting gesture taking the form of a single substantially vertically extending line input onto the display screen at a location that overlies a textual object and does not include a significant horizontal component;

means for identifying a portion of the overlaid textual object as being a first character or the overlaid textual object; and means for setting at least the first character or the overlaid textual object to one of the group consisting of upper and lower case based upon the direction that the case setting gesture is drawn by the user.

10. A computer system as recited in claim 9 wherein the means for detecting a case setting gesture will only recognize a case setting gesture when a substantially vertically extending line is input over a segment of text that has been previously selected by the user.

11. A computer system as recited in claim 9 wherein case setting gestures drawn in the upward direction are interpreted to require that the identified portion of the overlaid text be set to upper case and case setting gestures drawn in the downward direction are interpreted to require that the identified portion of the overlaid text be set to lower case.

12. A computer system as recited in claim 9 wherein the means of identifying a portion of the overlaid textual object determines whether the case setting gesture overlies the first character in the overlaid textual object and when the case setting gesture is determined to overlie the first character in the overlaid textual object, only the case of the first character of the overlaid text is reset.

\* \* \* \* \*